Dec. 3, 1946.    J. F. GRIFFIN ET AL    2,412,043
SUCTION STRAINER PROVIDED WITH SEDIMENT CHAMBER
Filed June 11, 1943

INVENTORS
Joseph F. Griffin
Emanuel Rawson
BY
ATTORNEY

Patented Dec. 3, 1946

2,412,043

UNITED STATES PATENT OFFICE 2,412,043

SUCTION STRAINER PROVIDED WITH A SEDIMENT CHAMBER

Joseph F. Griffin, Hammond, Ind., and Emanuel Rawson, Chicago, Ill., assignors to The Superheater Company, New York, N. Y.

Application June 11, 1943, Serial No. 490,402

5 Claims. (Cl. 210—165)

The present invention relates to strainers for separating entrained material from a liquid such as water flowing through the suction line of a pump or injector.

The invention is directed to improvements in a strainer of the type wherein a perforated screen is mounted in a chamber open at one end to an inlet for a liquid containing entrained particles with the screen arranged so that the liquid flows laterally outward through the screen to the fluid outlet while the disentrained particles fall through the bottom of the chamber into a sump where they are collected. A feature of the invention is a deflector mounted within the separating chamber so as to prevent agitation of the disentrained material in the sump.

The invention will be best understood upon consideration of the following detailed description of an illustrative embodiment thereof when read in conjunction with the accompanying drawing in which.

Figure 1:
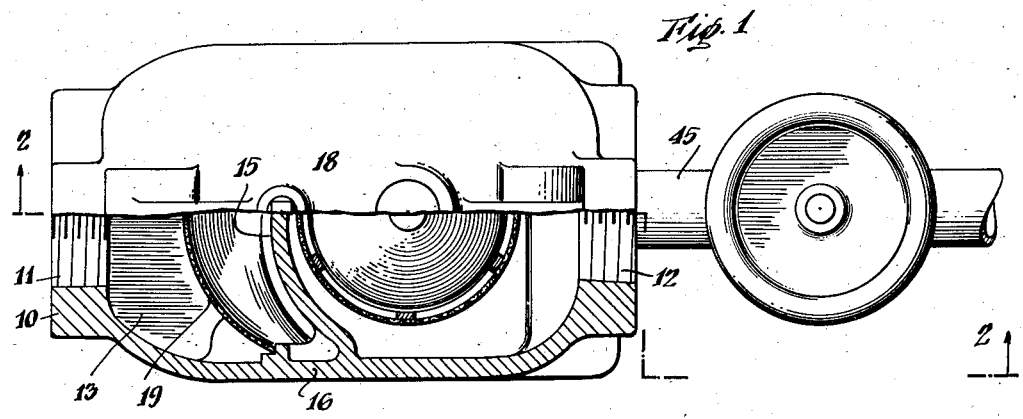
Figure 1 is a sectional elevation of a strainer embodying the invention.
Figure 2:
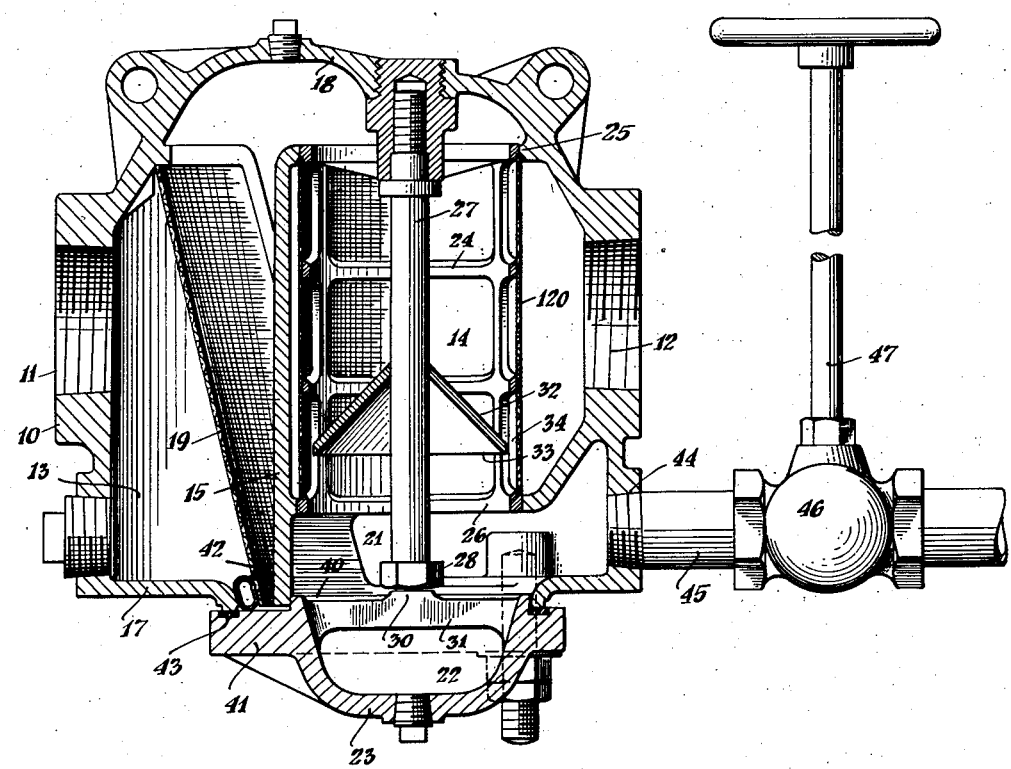
Figure 2 is a plan view corresponding to Figure 1 with parts broken away to show the internal construction.

In the drawing, the numeral 10 designates the housing of a strainer adapted to be interposed in the suction line of a pump or injector, being provided at one side with a fluid inlet 11 and at the other with an outlet 12. Interiorly the housing 10 is divided into two chambers 13 and 14 by a transverse partition 15 extending upwardly between the side walls 16 from the bottom end wall 17 to a point short of the top wall 18. Extending diagonally across the chamber 13 from the bottom wall 17 adjacent partition 15 to top wall 18 adjacent the top of inlet 11 is an arced or semi-circular screen 19. This screen is formed with relatively large perforations for separating the larger particles of material from the water or other liquid flowing through the strainer. The fluid flows over the top of partition 15 into chamber 14 which thus communicates at its upper end with the inlet 11 via chamber 13; in the side of chamber 14 opposite partition 15 is the outlet 12 for clarified liquid. Within the chamber 14 is a hollow screen 20 of cylindrical or other suitable form mounted so that fluid entering the upper end of chamber 14 passes laterally outwardly through the screen to the outlet 12 while particles of material that are disentrained by the screen drop from the inner surface thereof into a sump 21 formed at the bottom of the casing below the chamber 14. Part of the sump 21 is constituted by the recessed portion 22 of the removable cover 23 which will be described more completely later. The screen 20 is mounted on a cage 24 fitting at either end in openings 25 and 26 in the top and bottom walls of chamber 14 that communicate respectively with chamber 13 and the sump 21. The cage is held in place by a stud 27 screwed into the top wall 18 of the housing and is formed at its lower end with a head 28 spaced slightly from a boss 30 on a web 31 extending across the recess 22 in cover 23 when the cover is in place. The disposition of head 28 slightly above boss 30 prevents the stud 27 backing out of position in the event that it becomes loosened from vibration.

The stud 27 is provided with a generally conical deflecting member or apron 32 whose base 33 has a diameter somewhat less, say ½", than the interior diameter of the screen 20 so that an annular passage 34 ¼" wide is formed between the periphery of the base 33 of the deflector 32 and the contiguous interior surface of the screen 20. The deflector 32 is formed or mounted on the stem in such a position that its base 33 is located somewhat above the lower end of screen 20 so that an opening is left through which liquid may flow through part of the screen below the deflector. Particles of disentrained foreign matter falling from the interior wall of screen 20 above the deflector, as well as particles impinging against the latter, are drawn downwardly through the annular passage 34 by the water flowing therethrough to pass through the screen below the base 33 of the deflector. Consequently, the particles are positively drawn down so that they may fall into the sump 21.

We have found that in conventional strainers not provided with our deflecting shield 32, the downward flow of water through a cylindrical strainer tends to throw most of the particles down to the sediment sump but with the full force of the water flow directed against the entrapped material the fine particles of the latter were constantly agitated throughout the whole length of the strainer. In short, these fine particles were practically held in suspension, being picked up by the side flow through the strainer holes and plastered thereagainst so that the latter became almost completely plugged in a short period, even in instances where only a small amount of foreign matter (less than the capacity of the sump) had accumulated therein.

With the deflector cone 32 which we provide on the stud 27 the material entrapped within the cylindrical strainer tends to fall and be drawn through the annular space 34 into the sump 22 and the agitation thereof is decreased. When the deflector 32 is positioned so that its base 33 is above the bottom end of the cylindrical screen 20 so that fluid may flow therethrough below the deflector, the agitation of the particles is substantially eliminated and the strainer functions properly for long periods of time and practically to the full capacity of the sump 22 without excessive plugging of the fine holes in the strainer. Where the deflector 32 is formed as a hollow cone or apron attached to stud 27 it has been found that this space within the deflector also serves to retain the disentrained particles and may become fully filled before the strainer requires servicing to clean it.

In the normal operation of the strainer some of the material entrapped within the screen 20 tends to build up in its fine holes but does not cause much difficulty because of the large excess area of the circular screen. When the pump or injector with which the strainer is associated is shut off these particles fall toward the conical deflector 32 and when the pump or injector is restarted, this sediment is drawn down through the annular opening 34 into the sump 21 so that the screen 20 is then practically clear for the subsequent period of pump or injector operation. This action in short constitutes a sort of automatic self-cleaning feature.

In embodiments where a strainer that incorporates a coarse screen 19 as well as a fine screen 20 is not of excessive size, a single bottom cover 23 may be utilized with the result that both the screens 19 and 20 may be removed for cleaning upon the detachment of a single end cover. This construction embodies forming an end opening in the bottom wall 17 extending across the partition to include part of the bottom of chamber 13 as well as chamber 14. This opening is thus eccentric with respect to the axis of chamber 14. The single cover 23 is then provided with a ridge 40 concentric with the axis of the chamber 14 to fit within the bottom opening of the sump 21 while the eccentric portion 41 of the cover 23 overlies the part of the bottom opening that communicates with the other chamber 13 to the left of the transverse position 15. A suitable circular gasket 43 also eccentric with respect to the axis of chamber 14 fits between the cover 23 and the rim of the opening in the end wall 17 of the casing.

A cleanout opening 44 is provided for the sump 21, being located in the side or end wall of the housing. This opening may be closed by a removable cleanout plug; as shown it has a sediment discharge pipe 45 connected thereto. A valve 46 interposed in pipe 45 may be provided with an extended operating rod 47 so that the valve operating handle may be located at a point remote from the valve and strainer as in the cab of a locomotive in order to permit the fireman to clean out the strainer without descending from the cab and/or while the engine is in motion. The sediment may be flushed out of the sump by the normal head of water in a tender of a locomotive; where a more thorough cleaning of the fine strainer plate is desired the injector may be blown back with steam through the normal outlet opening 12 to clear the screen and sump.

Although a specific form of the invention has been described and shown in detail herein there are many changes and variations that may be made without departing from the invention.

What we claim is:

1. In a strainer having a casing formed with a chamber provided with a fluid inlet at its upper end and a fluid outlet below said inlet at one side of the vertical axis of said chamber, a vertically disposed screen mounted in said chamber having at least a part thereof disposed at said one side of the chamber axis and overlying said outlet so that fluid passes axially of said chamber and laterally outward through said screen to said outlet, and means forming a sediment receiving sump on the inlet side of said screen below and communicating with the bottom of said chamber; a deflecting shield mounted within said chamber at the inlet side of said screen and inclined downwardly and outwardly toward said screen with its lower end disposed close to and above the bottom of said screen and positioned adjacent to but spaced from said screen to form therewith a passage for sediment to be drawn down into said sump by fluid flowing through said passage to pass through the part of said screen below said shield.

2. In a strainer having a casing formed with a chamber provided with a fluid inlet at its upper end and a fluid outlet below said inlet at one side of the vertical axis of said chamber, an open ended cylindrical screen interposed between said inlet and outlet and in communication at its upper end with said inlet so that fluid passes axially of said chamber and laterally outward through said screen to said outlet, and a sediment sump below and communicating with the bottom end of said screen; a generally conical particle deflecting shield mounted within and surrounded by said screen and having a diameter at its base somewhat less than the interior diameter of said screen for providing a narrow annular passage between the periphery of the base of said shield and the contiguous part of said screen.

3. In a strainer having a casing formed with a chamber provided with a fluid inlet at its upper end and a fluid outlet below said inlet at one side of the vertical axis of said chamber, an open ended cylindrical screen interposed between said inlet and outlet and in communication at its upper end with said inlet so that fluid passes axially of said chamber and laterally outward through said screen to said outlet, and a sediment sump below and communicating with the bottom end of said screen; a generally conical particle deflecting shield positioned within and surrounded by said screen and having a diameter at its base somewhat less than the interior diameter of said screen for providing a narrow annular passage between the periphery of the base of said shield and the contiguous part of said screen; and means supporting said shield within said screen with its base located above the bottom of said screen so fluid may flow down through said annular passage and thence laterally through said screen.

4. In a strainer having a casing formed with a chamber provided with a fluid inlet at its upper end and a fluid outlet below said inlet at one side of the vertical axis of said chamber, an open ended cylindrical screen interposed between said inlet and outlet and in communication at its upper end with said inlet so that fluid passes axially of said chamber and laterally outward through said screen to said outlet, and a sediment sump below and communicating with the bottom end of said screen; a cage carrying said screen; a bolt supporting said cage fastened in the end wall of said casing opposite the inlet end of said chamber and extending axially of the latter with the bolt head located in said sump; a removable cover for the bottom of said sump located below said bolt; and a boss formed on said cover in a position opposite and closely adjacent the head of said bolt for limiting axial movement of the latter.

5. In a strainer having a casing formed with a chamber provided with a fluid inlet at its upper end and a fluid outlet below said inlet at one side of the vertical axis of said chamber, a vertically disposed screen mounted in said chamber having at least a part thereof disposed at said one side of the chamber axis and overlying said outlet so that fluid passes axially of said chamber and laterally outward through said screen to said outlet, and means forming a sediment receiving sump in communication with said chamber at the inlet side of said screen; a deflecting shield mounted within said chamber at the inlet side of said screen and inclined downwardly and toward said screen with its lower end spaced from the straining surface of said screen for forming therewith a restricted passage at one end of said deflector leading to said sump to permit passage of particles of foreign matter into said sump, said screen and shield being so disposed with respect to said sump as to provide for the escapement of some of the fluid from said sump to said outlet to insure a positive flow of fluid and foreign matter past the deflector into the sump.

JOSEPH F. GRIFFIN.
EMANUEL RAWSON.